United States Patent [19]

Kettenbauer

[11] Patent Number: 4,932,862
[45] Date of Patent: Jun. 12, 1990

[54] SUSPENDED GAS REACTOR

[75] Inventor: Franz Kettenbauer, Murg, Fed. Rep. of Germany

[73] Assignee: Kettenbauer GmbH & Co., Murg, Fed. Rep. of Germany

[21] Appl. No.: 225,940

[22] Filed: Jul. 29, 1988

[30] Foreign Application Priority Data

Jul. 29, 1987 [DE] Fed. Rep. of Germany ....... 3725512

[51] Int. Cl.$^5$ .............................................. F27B 15/00
[52] U.S. Cl. ...................................... 432/58; 432/14; 432/106
[58] Field of Search .......................... 432/14, 58, 106; 110/245

[56] References Cited

U.S. PATENT DOCUMENTS

| | | | |
|---|---|---|---|
| 3,904,353 | 9/1975 | Bosshard et al. | 432/106 |
| 4,118,176 | 10/1978 | Mollenkopf et al. | 432/106 |
| 4,119,396 | 10/1978 | Abelitis et al. | 432/106 |
| 4,177,742 | 12/1979 | Uemura et al. | 110/245 |
| 4,248,639 | 2/1981 | Quittkat | 432/106 |
| 4,514,170 | 4/1985 | Kupper | 432/14 |
| 4,616,576 | 10/1986 | Engstrom et al. | 110/245 |
| 4,693,682 | 9/1987 | Lee et al. | 110/245 |

FOREIGN PATENT DOCUMENTS

| | | |
|---|---|---|
| 0003216 | 11/1978 | European Pat. Off. . |
| 1207361 | 12/1965 | Fed. Rep. of Germany . |
| 2411669 | 9/1974 | Fed. Rep. of Germany . |
| 2044141 | 9/1975 | Fed. Rep. of Germany . |
| 2550418 | 5/1977 | Fed. Rep. of Germany . |
| 2361427 | 4/1981 | Fed. Rep. of Germany . |
| 3015290 | 10/1981 | Fed. Rep. of Germany . |
| 3125401 | 1/1983 | Fed. Rep. of Germany . |
| 2723094 | 9/1984 | Fed. Rep. of Germany . |
| 2846584 | 12/1984 | Fed. Rep. of Germany . |
| 2527149 | 8/1986 | Fed. Rep. of Germany . |
| 3540206 | 5/1987 | Fed. Rep. of Germany . |
| 2550469 | 12/1987 | Fed. Rep. of Germany . |
| 3630097 | 3/1988 | Fed. Rep. of Germany . |

OTHER PUBLICATIONS

Von L. Reh, "Calcining in the Circulating Fluidized Bed", Zement-Kalk-Gips, vol. 36, No. 9, 1983, pp. 512-516.
Von L. Kwech, "Brennverfahren", Zement-Kalk--Gips, vol. 30, No. 12, Dec. 1977, pp. 597-607.
Verfahren für Klärschlammverbrennung, Escher Wyss (Fliessebett-Technik).
Verfahrenstechnik II und Reaktionsapparate, Ulmanns Encyklopadie Der Technischen Chemie, vol. 4, No. 3, pp. 456-457.

Primary Examiner—Henry C. Yuen
Attorney, Agent, or Firm—Spencer & Frank

[57] ABSTRACT

In a method of thermal treatment of particles, the particles are blown into a hot gas stream by means of a reactor blower. In a circle around a fuel jet and through an entry opening the particles are blown through a diffuser into the bottom of a vertically oriented cylindrical reactor chamber of a suspended gas rector. They are passed through an exit opening at the top of the reactor chamber. During this process the fuel gas stream, which is produced by a burner and is directed into the reactor chamber, forms a convective stream with the particles located therein. Particles that exceed a certain predetermined maximum size are fed into a part of the reactor chamber that is above the diffuser.

17 Claims, 6 Drawing Sheets

SUSPENDED GAS REACTOR

FIELD OF THE INVENTION

The invention concerns a method and apparatus for the thermal treatment of particles.

BACKGROUND OF THE INVENTION

From the journal "Cement-Lime-Calcium Sulfate" (No. 5/1984, pages 219-225) a method for the calcination of raw cement powder in a circulating vortex layer is known. This method makes use of a system that consists of a shaft-like reactor, a precipitation cyclone and a pressure closure between the cyclone and the reactor in the form of a syphon. In the reactor there is a strongly expanding vortex layer of a fine-grained solid substance with declining suspension density from the grate to the reactor head. The solid substance, which is separated from the gas in the reversing cyclone during the external circulation, moves through the syphon back into the reactor. A partial stream according to the entry amount is extracted and controlled by a measuring device.

In addition to this external circulation of a solid substance, an inner re-circulation is produced by the continuously changing formation of strands in the reactor, which, under the relatively low transportation speed of the solid substance, leads to high relative speeds and extremely intense mixing movements between the gas and the solid substance. This causes good heat and substance exchange, which enables a relatively fast reaction turnover with good constant temperature within the entire system of the circulating vortex layer.

The fuel necessary for the endothermal reaction may be added to the lower part of the calcinator as fuel gas, as fluid, or as a solid fuel, and may be burned directly in suspension without the formation of a flame. The necessary combustion air is added to the calcinator as primary combustion air through the vortex bottom and as secondary combustion air above the grate, and serves together with the exhaust from the combustion and from the de-acidifying reaction as the vortex medium.

Since in the known procedure with a circulating vortex layer the heating of the material is performed in the vortex bed, a relatively long heating period of the various particles of the material of up to 3 minutes is required.

Besides a relatively high use of energy, the interspersing of the entire system and therefore the capacity of the entire system to produce cement clinker is limited by the required heating period.

SUMMARY OF THE INVENTION

It is the object of the present invention to provide a method and apparatus that guarantee very fast heat insertion into the material particles and enable less use of energy, as well as providing higher performance for the thermal treatment of particles.

According to the invention, this object is achieved by the particles being blown into a fuel gas stream that is directed into a reactor chamber, there joining with particles located within the reactor chamber in the area of a convective stream, the stream passing through an exit opening that is positioned along the course of the stream.

Apparatus according to the invention is characterized by a suspended gas reactor with a reactor chamber that has an entry and an exit opening for the particles, as well as a reactor burner with a fuel jet positioned in the area of the entry opening for the formation of a fuel flame directed into the reactor chamber.

The method and apparatus of the invention secure a very fast heat entry into the various particles of a certain material, and, by using little energy, enable a high interspersing of the material during the thermal treatment and therefore high performance of the entire system in which the apparatus is installed.

An advantageous use of the method is the thermal preparation and/or pre-calcination of raw cement sludges or raw cement powder during the production of cement clinker by the wet or dry process, or the thermal treatment of particles for the production of calcinated anhydride or lime hydrate, or the thermal treatment of contaminated sludges, especially sewage and/or industrial sludges, or the thermal treatment of flatulent sand, flatulent pumice, perlite or the like.

The invention will be further explained in connection with the embodiment thereof illustrated in the drawings:

DETAILED DESCRIPTION OF PREFERRED EMBODIMENTS

Figure 1:
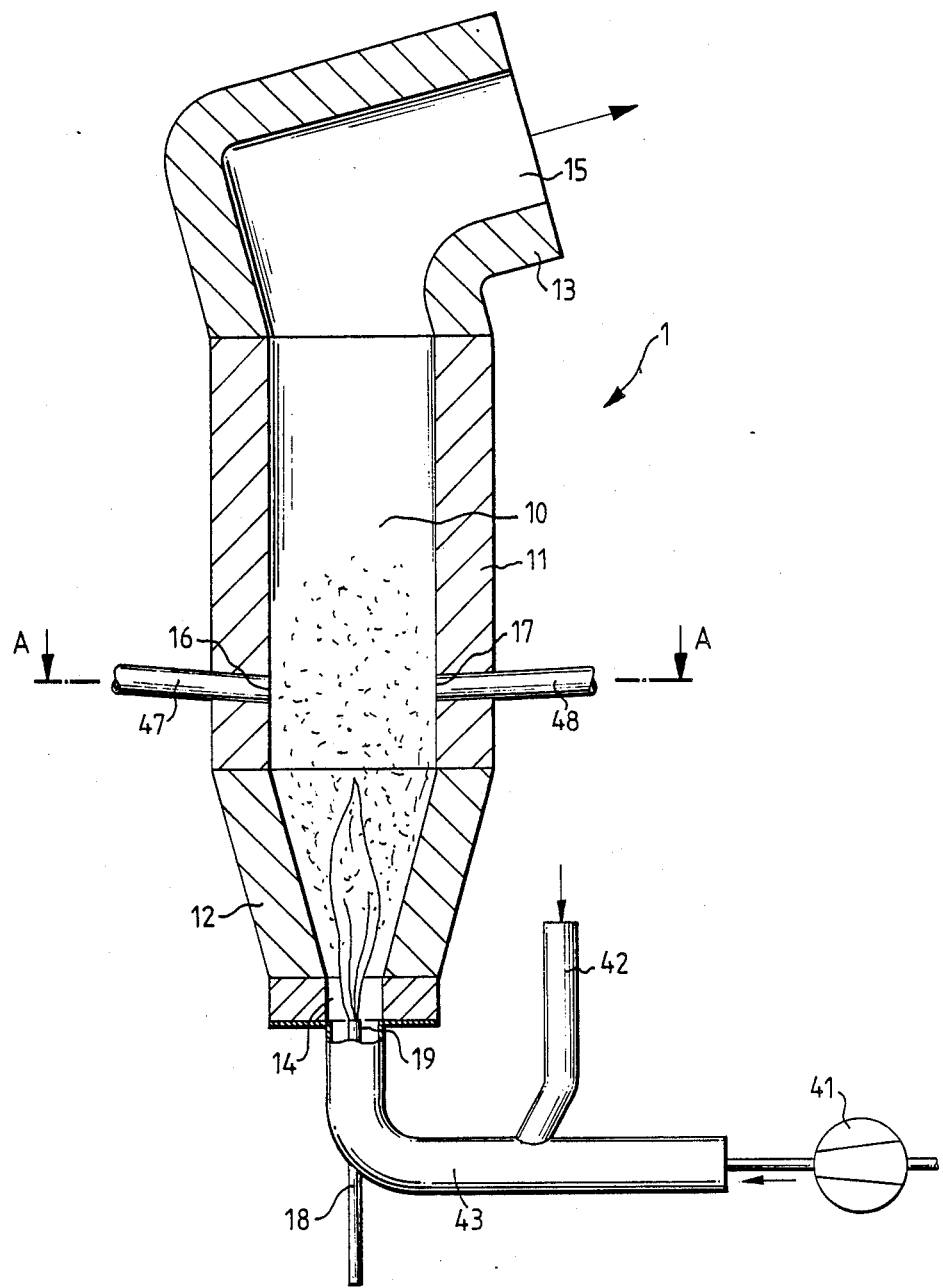
FIG. 1 shows a longitudinal section of a suspended gas reactor.

The longitudinal section of a suspended gas reactor 1 in FIG. 1 shows a reactor chamber 10 which is enclosed by a cylindrical main structure defined by a wall 11, and a tapered diffuser in the shape of a truncated cone 12 which is connected beneath it. At the upper end of the cylindrical wall 11 an angled pipe 13 is connected, by which pipe the thermally treated particles are disposed of through an exit 15 for further treatment.

At the lower end of the diffuser 12 there is an entry opening 14 to which a particle/hot gas pipe 43 is joined. The pipe 43 is connected to a hot gas blower 41, through which pre-heated gas is blown into the combustion chamber 10. The pipe 43 is joined by a particle pipe 42 through which the material to be thermally treated is blown into the pipe 43 where it is swept along by the hot gas.

Preferably concentrically with the pipe 43 there is a fuel jet 19 of a reactor burner 18, whereby a flame is blown into the reactor chamber 10.

Inside the cylindrical wa 1 11 of the reactor 1 and preferably in the lower third of the main structure, there are two additional openings 16, 17 opposite each other, which are connected with two drop pipes 47, 48 through which particles with a larger cross-section than for example 0.5 mm can be fed into the reactor chamber 10.

Figure 2:
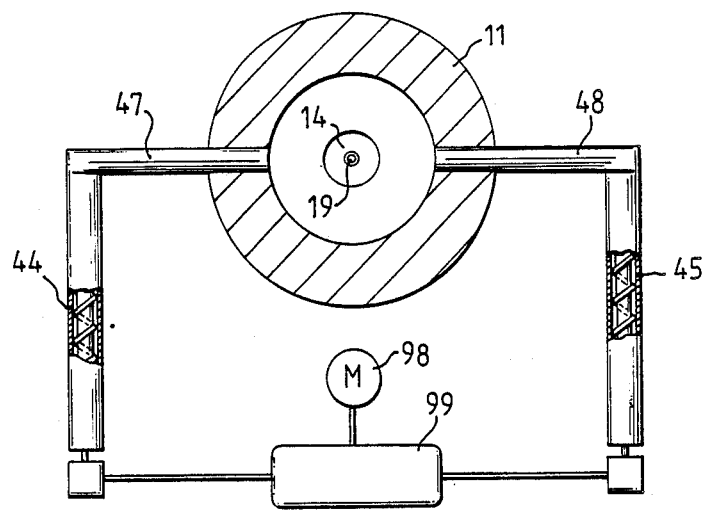
FIG. 2 shows a cross-section of a suspended gas reactor along the line A—A according to FIG. 1.

FIG. 2 shows a section on the line A—A in FIG. 1, and illustrates the positions of the openings 16, 17 of the drop pipes 47, 48 which are connected to respective measuring helix conveyor pipes 44, 45 that are run synchronously by a mechanism 99 driven by a motor 98.

Figure 4:
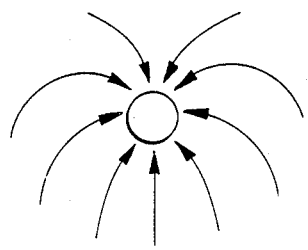
FIG. 4 is a schematic illustration of heat entry into a particle.

The function of the apparatus of FIGS. 1 and 2 will be explained with the help of FIGS. 3 and 4.

The dry material, for example raw cement powder or pre-dried cement sludge, is entered continuously by means of the hot gas blower 41 through the entry opening 14 of the reactor chamber 10 into the suspended gas reactor 1 and is heated to a temperature of about 400–500C.° with the help of the reactor burner 18. During this process each individual particle that is blown in from beneath and whose solid size is less than 0.5 mm is taken up and surrounded by the hot gas stream. FIG. 3 shows the convective stream of the particles, while FIG. 4 shows an individual particle entirely surrounded by the hot gas stream.

Figure 3:
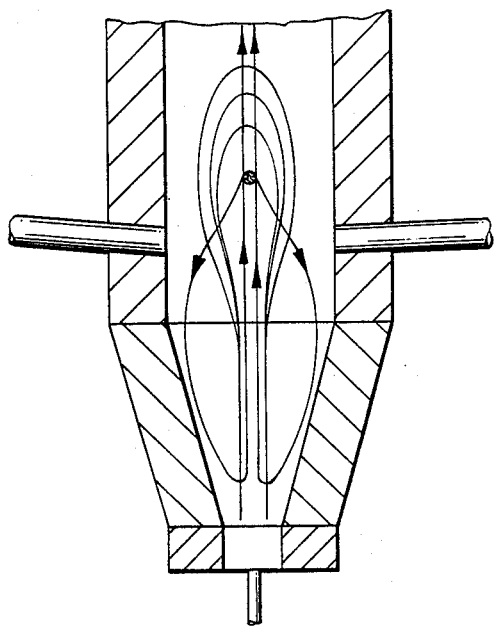
FIG. 3 is a schematic illustration of particle movement in the area of a diffuser of the suspended gas reactor.

Larger particles entering through the openings 16, 17 fall down into the diffuser, as can be seen in FIG. 3, and are driven up by the entering hot gas and are also surrounded entirely by the hot gas. This results in an extremely fast heat entry into the individual particles, which considerably reduces the period of time in the suspended gas reactor compared to conventional vortex layer methods, and generally leads to a considerably lower consumption of energy for heating the particles and achieving a higher degree of interspersing and therefore a higher performance for the entire system.

Figure 5:
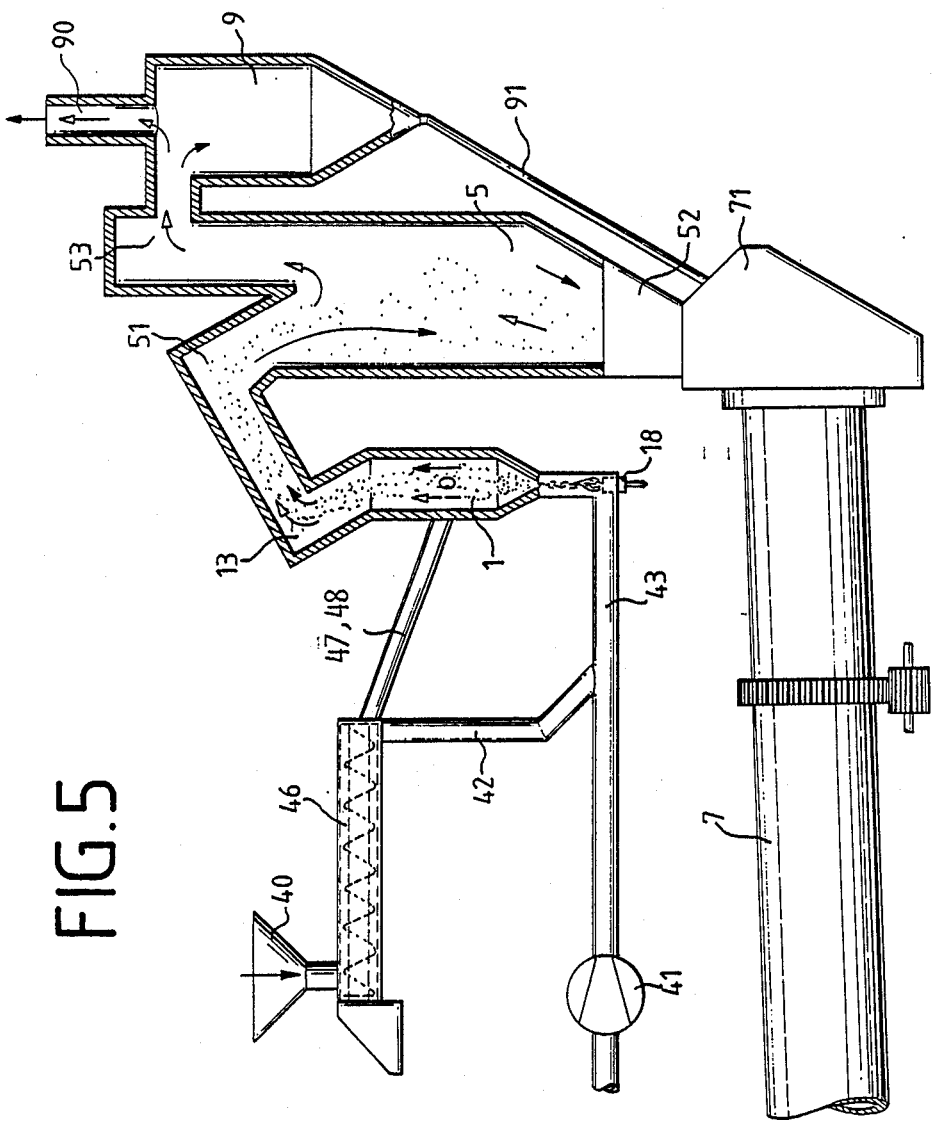
FIG. 5 shows part of a clinker burning construction with pre-calcination working with the dry or wet procedure.

FIG. 5 shows a section of a clinker burning apparatus with a suspended gas reactor for the pre-calcination of raw cement powder or pre-dried cement sludge, which can operate alternatively with the dry or the wet procedure.

Through a silo 40 either raw cement powder or pre-dried cement sludge is passed into a measuring helix 46 which, through the helix conveyor pipes 44, 45 of FIG. 2, either enters the material directly into the cylindrical main structure within the wall 11 of the reactor or into a particle pipe 42 which joins the particle/hot gas pipe 43. There, the material is carried along by the hot gas stream produced by the hot gas blower 41 and is blown into the reactor chamber 10 through the entry opening 14.

The particles which are heated inside the reactor chamber 10 and are carried along by the hot gas stream which is additionally heated by the reactor burner 18, are carried to a calcinator entry 51 through the exit opening 15. Inside a calcinator 5, the particles are further heated in the oppositely directed stream of the exiting revolving stove exhaust, and, through a main calcinator exit 52, reach a revolving pipe stove 7 where, due to the effect of a stove exhaust of about 1100 C.°, they undergo further pre-heating of up to 750 C.°.

Because of the high gas temperature of the revolving pipe stove and the low specific gravity of the hot gases, e.g. the low cross-section of the gas stream, a small part of the particulate material is carried along by the gas stream which is separated from the main gas stream by a calcinator side exit 53 to pass to a precipitation cyclone 9, and eventually reaches the revolving pipe stove 7 through an entry 91. The exhaust from the precipitation cyclone 9 is disposed of through an exit 90.

Use of the suspended gas reactor 1 together with the calcinator 5 provides the following advantages for the production of cement clinker through the dry or wet procedure:

1. The revolving pipe stove can be considerably shortened, since the pre-heating and calcination of the material which usually takes place in the revolving pipe stove are performed in the suspended gas reactor 1 and in the calcinator 5 or the precipitation cyclone 9, so that only the sinter procedure is left to the revolving pipe stove 7. The shortening of the revolving pipe stove also reduces the loss of heat radiation, since the temperature of the gas blown into the revolving pipe stove only has to suit the sinter procedure, and because, due to the length reduction, there is a smaller surface of the revolving pipe stove 7 through which heat can be lost.

2. The suspended gas reactor 1 and the calcinator 5 can be insulated to such an extent that their loss of heat can be ignored.

3. 7–10% energy can be saved, which in regard to the entire construction may result in an energy cut of up to ⅓. Compared to the 1350–1550 kcal/kg clinker required for conventional constructions, this means a reduction of up to 100–150 kcal/kg cement clinker or all together of up to 450–550 kcal/kg cement. The entire system, therefore, can be operated with 900–1000 kcal/kg.

4. The reduction of the duration periods and the optimum pre-heating and pre-calcination of the finest particles before entering the revolving pipe stove, as well as the increase of the number of rotations of the shortened stove, enable a total increase in performance of up to 80% depending on the size of the stove.

Figure 6:
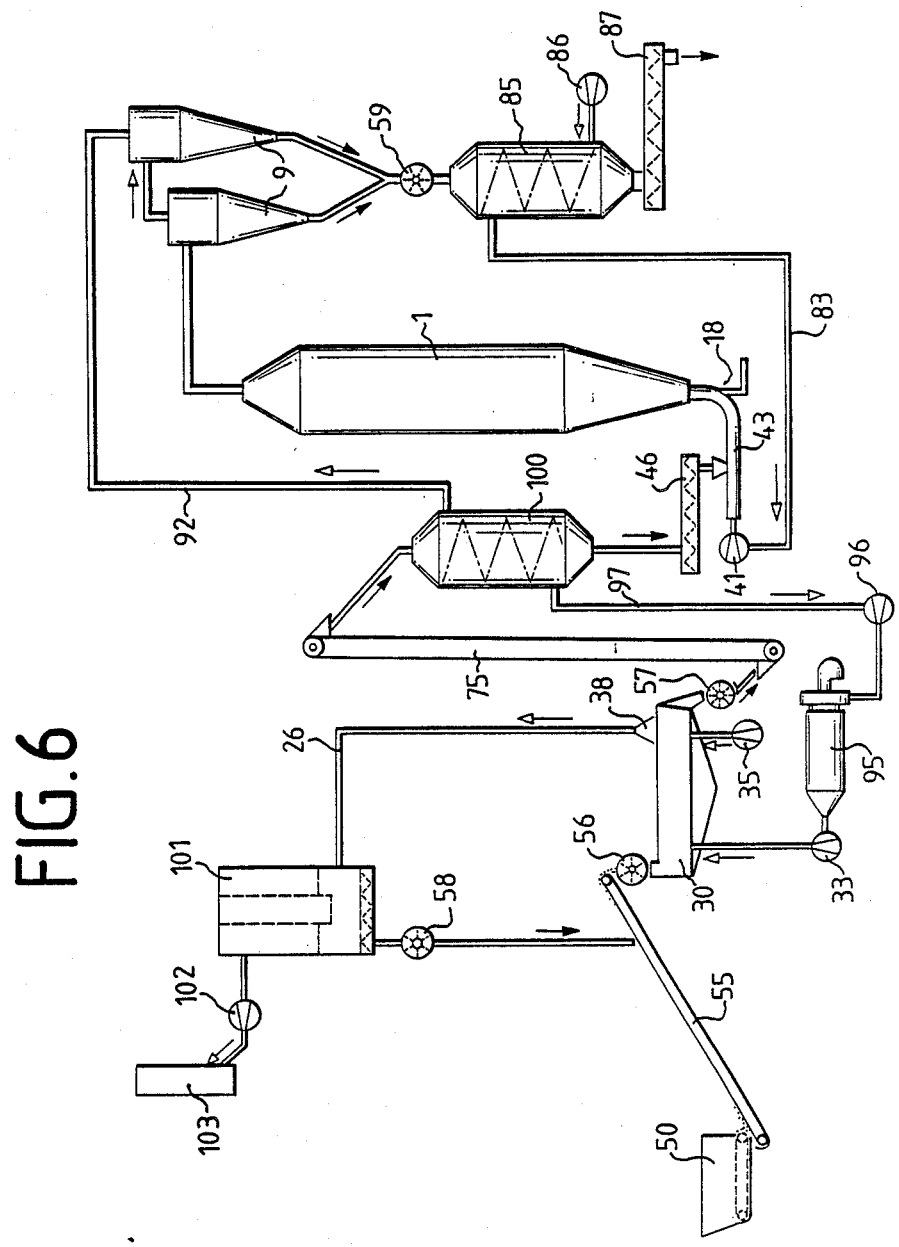
FIG. 6 is a schematic illustration of a construction for the thermal treatment of solid and/or pasty substances by using a suspended gas reactor.

FIG. 6 shows construction for blowing out or burning of, for example lime, anhydride, perlite, flatulent pumice, as well as flatulent sand and the like.

The construction has a box or large space dispenser 50 in which the pasty substances are gathered and through a transportation belt 55 and a bucket wheel drain 56 are fed to a vibration dryer 30. The pasty substances which in the vibration dryer 30 are pre-dried by ventilators and, with the help of a combustion chamber 95, are deposited by a bucket wheel drain 57 onto an elevator 75 which puts the dry substance from above into a pre-heater 100. The pre-heated substance is then fed from the pre-heater 100 onto a measuring helix 46 from where the individual particles are blown through the particle/hot gas pipe 43 into the suspended gas reactor 1.

The particles which are thermally treated inside the reactor 1 are transported to precipitation cyclones 9 in which they are separated from the hot gas and fed through an additional bucket wheel drain 59 to a cooler 85. From the cooler 85 the thermally treated particles pass to a conveyor helix 87 and are finally disposed into a silo.

The exhaust of the vibration dryer 30 is fed to a filter 101 where the finest particles are separated and through a bucket wheel drain 58 are fed back to the transportation belt 55. The exhaust is cleaned in the filter 101 and fed to a chimney 103 through an exhaust ventilator 102.

The fuel gas which enters into the vibration dryer 30 is heated in the combustion chamber 95 and is fed to the vibration dryer 30 through a ventilator 33. The combustion chamber 95 receives pre-heated gas from the pre-heater 100 through a blower 96. The pre-heater 100 itself is supplied with heated gas by the exhaust from the precipitation cyclones 9 through a pipe 92.

The exhaust heat of the cooler 85 is fed through a pipe to the hot gas blower 41 which blows the particles supplied by the measuring helix 46 into the suspended gas reactor 1.

Figure 7:
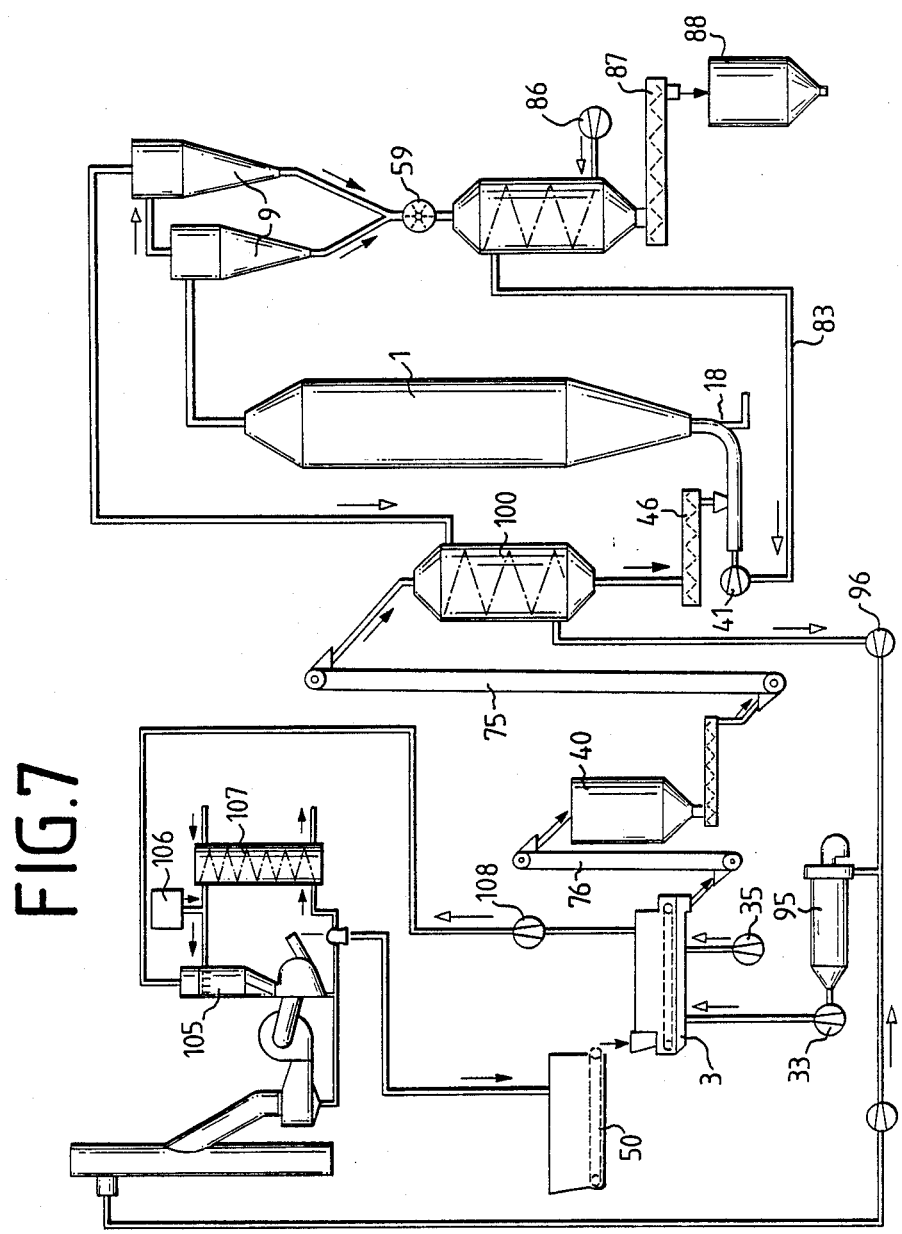
FIG. 7 is a schematic illustration of a suspended gas reactor construction for any pasty material.

FIG. 7 shows a suspended gas reactor construction for any pasty material.

The construction has a box or large space dispenser 50 in which the pasty substances are gathered and through a transportation belt 55 and a bucket wheel drain 56 are fed to a vibration dryer 30. The pasty substances which in the vibration dryer 30 are pre-dried by ventilators and, with the help of a combustion chamber 95, are deposited by a bucket wheel drain 57 onto an elevator 75 which puts the dry substance from above into a pre-heater 100.

Other parts of the apparatus with similar reference numerals are the same as in FIG. 6.

The construction of FIG. 7 fulfills the following tasks:

1. Drying of the pasty substance
2. Burning of the pasty substance
3. Thermal after-burning of fumes
4. Cleaning of fumes
5. Disposal of ashes and, depending on the chemo-physical combination of the substance, production of a light additional substance.

The method for burning a pasty substance, for example contaminated sludge, will now be further explained.

The accruing contaminated sewage or industrial sludge is fed to the large space dispensers of the construction, which have a capacity of, for example, 200 cubic meters. From the large space dispensers the sludge is continuously withdrawn and fed to the belt dryer 3. In the belt dryer 3, the sludge with a maximum of 70% humidity, is dried to a humidity of about 3 to 5%.

The required energy is gained from the thermal after-burning of fumes and additional heating.

After drying, the sludge is ground to a size of less than 1.0 mm and then stored in the supply silo 40 which has a content of about 20 cubic meters. The ground sludge from the silo is continuously fed to the indirect pre-heater 100 where pre-heating to about 150 to 200C.° takes place. Thereafter, the ground material is blown pneumatically direct into the flame of the suspended gas reactor 1, so that an immediate burning can take place, and in the remaining part of the suspended gas reactor with a temperature of 1100 to 1200 C.° a complete inertization of the substances will occur.

99.6% of the inert ashes are disposed under a temperature of about 1000 C.° in the precipitation cyclone and are cooled down in the indirect cooler 85 to 50 or 60 C.°. After cooling the ashes reach an ashes silo 88 through a disposal helix, in which silo they can be temporarily stored until the production of light flux substances.

The exhaust leaving the precipitation cyclones 9 reaches the thermal after-burning through the indirect pre-heater 100. The exhaust is there heated to about 1200 C.°, and within duration periods of about 3 seconds all organic substance is burned out.

Thereafter, the hot exhaust is mixed with fresh air and the gases reach the belt dryer 3 for the drying of the sludge at about 350 C.°.

The exhaust gases leave the belt dryer 3 at about 80 to 90 C.° with an amount of water vapor of, for example, about 4200 kg/h (depending on the water content of the substance to be dried) and are fed further to the wet washing device 105.

In the wet washing device 105 gas cleaning takes place by adding base additives for the binding of acid components through the measuring device 106. The accruing sludge (about 15 to 20 kg/h, including lime or sodium hydroxide) is withdrawn at intervals from the wet washing device and is fed to the belt dryer 3 or is mixed in the box dispenser 50 with newly added sludge.

80% of the exhaust from the wet washing device 105 at about 30 C.° reaches the gas mixing process before the belt dryer 3, so that an exhaust amount of only about 20%, for example 7000 norm cubic meters per hour, is released into the atmosphere.

As can be seen from the two diagrams described above, both constructions have a fully closed cycle process, so that there is no danger of any contaminated substance or gas leaving the cycle uncontrolled.

Figure 8:
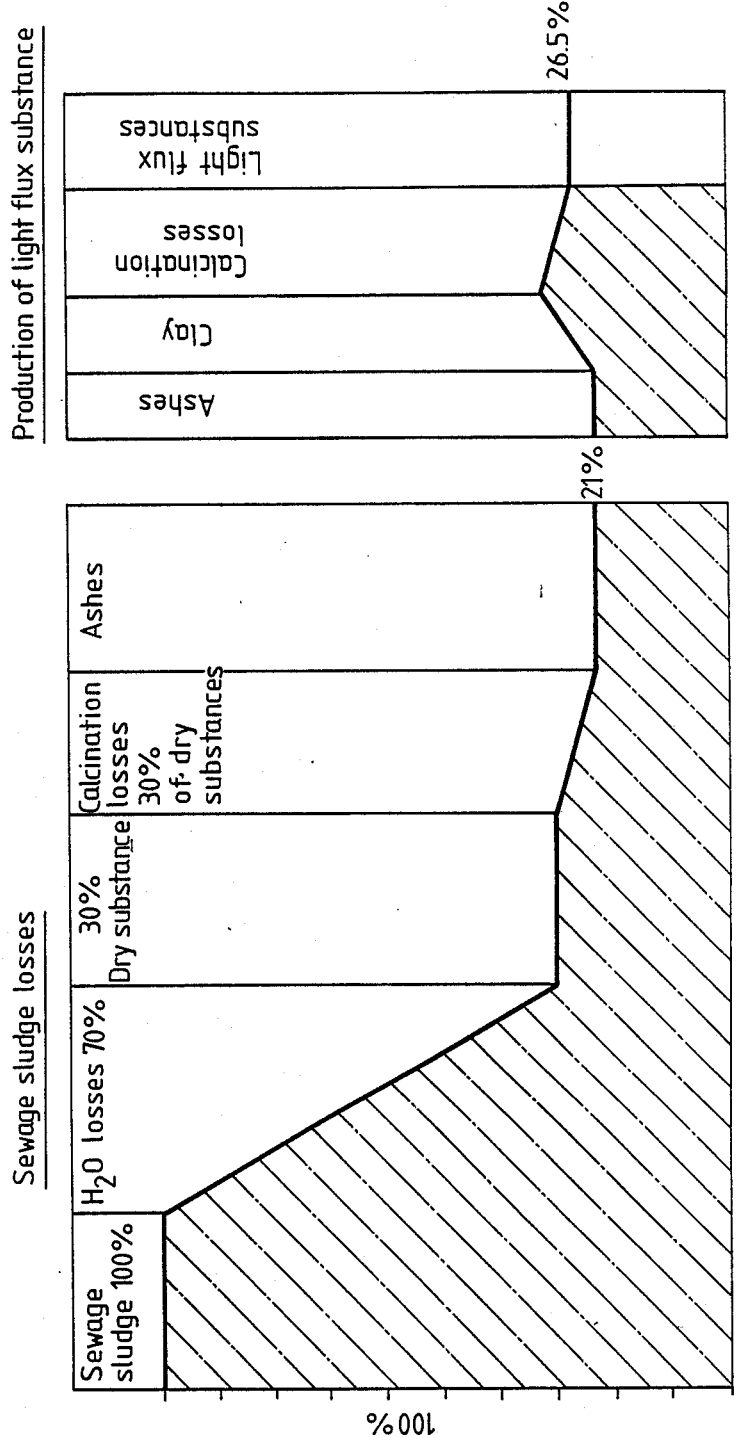
FIG. 8 is a diagram for the thermal treatment of sewage sludge.

FIG. 8 shows a diagram of the quantitative relations for the recycling of sewage or industrial sludges, and illustrates the efficiency of the apparatus described above. Through the thermal treatment of the sludge 70% water is withdrawn from the sludge, so that out of 100% sludge 30% of dry substances remain. Through calcination losses an additional 30% of the dry substances are reduced, so that a portion of ashes of about 21% of the original 100% sewage or industrial sludge remains. By adding a flux material, for example clay, a flux material free of poisonous substances can be gained from the remaining ashes which can be put to any use.

The invention is not limited to the preferred example indicated above. A number of variations can be employed.

I claim:

1. Apparatus for the thermal treatment of particles, comprising:

a suspended gas reactor with a reactor chamber having first and second entry openings and an exit opening for the particles;

a reactor burner with a fuel jet located in the area of said first entry opening for directing a fuel flame into said reactor chamber;

said fuel jet being arranged concentrically at said first entry opening, through which small particles not exceeding a predetermined size are fed into a hot gas stream and are blown around said fuel jet into said reactor chamber to form a convective stream with particles already located therein, the particles being passed through said exit opening located along the course of the gas stream, and wherein said reactor chamber comprises:

a cylindrical main structure arranged generally vertically for developing the convective stream of particles located therein, said main structure having said second entry openings for the entry of larger particles exceeding said predetermined size, and a diffuser in the shape of a truncated cone which tapers downwardly beneath said main structure to said first entry opening and through which the particles are blown into the bottom of said main structure.

2. Apparatus according to claim 1 wherein said exit opening is formed as an angled pipe connected to an upper end of said main structure and has an inner diameter corresponding to the inner diameter of said main structure.

3. Apparatus according to claim 1 wherein the fuel jet is arranged concentrically in said first entry opening, and the particles are fed into a hot gas stream through a jet and are blown around said fuel jet into said first entry opening of the reactor chamber.

4. Apparatus according to claim 1, wherein said first entry opening is connected to a particle/hot gas pipe into which hot gas produced by a hot gas blower is blown,
and said particle/hot gas pipe is connected to a particle pipe through which particles are fed into said particle/hot gas pipe so as to be carried along by the hot gas stream.

5. Apparatus according to claim 1 wherein: said main structure has at least two of said second entry openings, which are positioned symmetrically to its longitudinal axis, for the entry of particles exceeding said predetermined size.

6. Apparatus according to claim 5 wherein said second entry openings are arranged in the lower third of the main structure.

7. Apparatus according to claim 5 wherein said second entry openings are connected to helix conveyor pipes and drop pipes for connection to a disposal device for the particles.

8. Apparatus according to claim 5 wherein said predetermined size of the particles if 0.5 mm.

9. Apparatus according to claim 2 wherein said second entry opening is disposed in the lower one third of the cylindrical wall of said main structure.

10. Apparatus according to claim 9, wherein said first entry opening is connected to a particle/hot gas pipe into which hot gas produced by a hot gas blower is blown, and said particle/hot gas pipe is connected to a particle pipe through which particles are fed by a jet into said particle/hot gas pipe so as to be carried along by the hot gas stream.

11. Apparatus for the thermal treatment and/or precalcination of raw cement sludge or raw cement powder during the production of cement clinker in wet or dry procedure, comprising:
a suspended gas reactor with a reactor chamber having an entry opening and an exit opening for particles, and a reactor burner with a fuel jet located in the area of said entry opening for directing a fuel flame into said reactor chamber, wherein said particles are blown into a fuel gas stream that is directed into said reactor chamber at said entry opening where it forms a convective stream with particles already located therein, the particles being passed through said exit opening located along the course of the fuel gas stream;
a particle/hot gas pipe connected to said entry opening and to a helix conveyor pipe connected to a silo through a conveyor helix for intake of pre-dried raw cement sludge or raw cement powder particles;
a calcinator, in which after-calcination takes place, whose intake is connected with said exit opening of said reactor chamber;
a revolving pipe stove, the entry of which is connected with a main exit of said calcinator; and
a precipitation cyclone which is connected with a side exit of said revolving pipe stove wherein the particles that are passed through said exit opening and thermally treated are fed into said calcinator and/or said precipitation cyclone for further thermal and/or chemical treatment.

12. Apparatus according to claim 11 wherein the reactor chamber comprises:
a cylindrical main structure arranged generally vertically for developing the convective stream of particles located therein;
a diffuser in the shape of a truncated cone which tapers downwardly beneath said main structure to said entry opening and through which the particles are blown into the bottom of said main structure; and
said exit opening is formed as an angled pipe connected to an upper end of said main structure and has an inner diameter corresponding to the inner diameter of said main structure.

13. Apparatus according to claim 11 wherein: the fuel jet is arranged concentrically in the entry opening; and a hot gas blower is connected to said particle/hot gas pipe, whereby the particles are fed into a hot gas stream and are blown circularly around said fuel jet into the entry opening of the reactor chamber.

14. Apparatus according to claim 12 wherein: the particles blown into said reactor chamber via said entry opening do not exceed a predetermined size; and said main structure has at least two additional openings, which are positioned symmetrically to its longitudinal axis, for the entry of particles exceeding said predetermined size.

15. Apparatus according to claim 14 wherein said additional openings are arranged in the lower third of the main structure.

16. Apparatus according to claim 12 wherein: the particles blown into said reactor chamber via said entry opening do not exceed a predetermined size; and said main structure has at least one additional opening, which is disposed in the cylindrical wall of said main structure, for the entry of particles exceeding said predetermined size.

17. Apparatus according to claim 16 wherein said additional opening is arranged in the lower third of said main structure.

* * * * *